A. R. MUTTON.
REGISTERING DEVICE.
APPLICATION FILED OCT. 3, 1914.
1,178,746.
Patented Apr. 11, 1916.
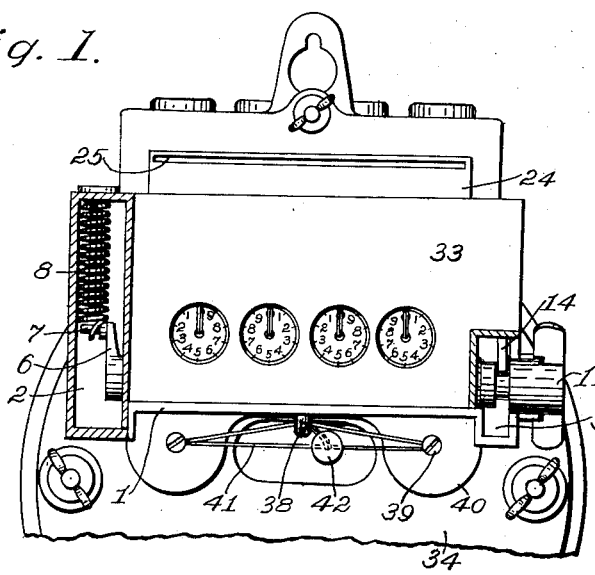
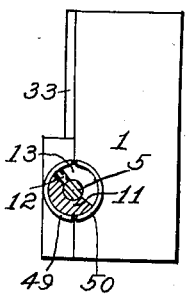
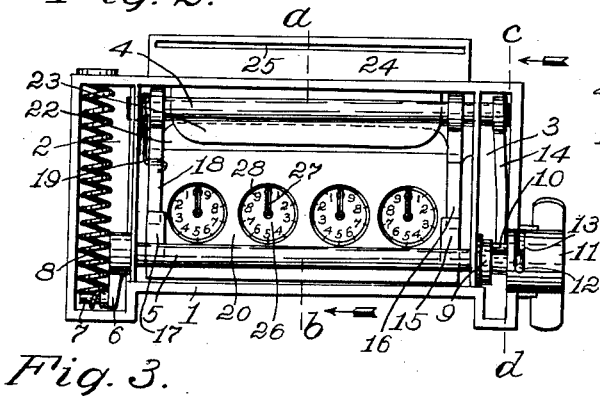
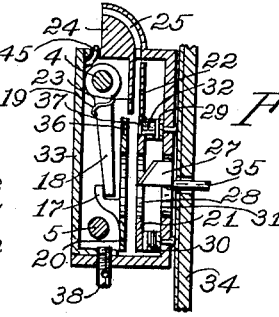
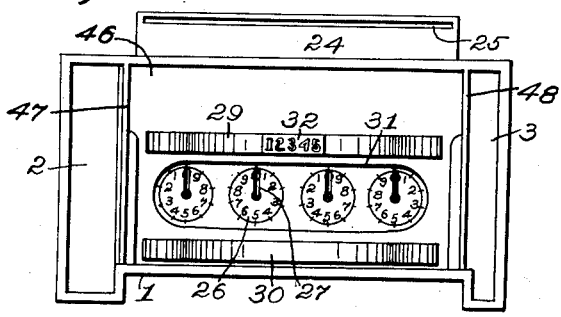
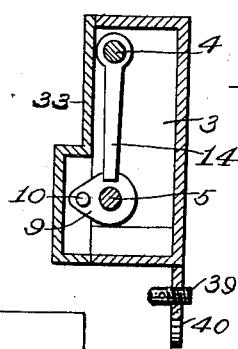
Witnesses:
Inventor,
A. R. Mutton,
by G. C. Kennedy,
Attorney.

UNITED STATES PATENT OFFICE.

ARTHUR R. MUTTON, OF WATERLOO, IOWA.

REGISTERING DEVICE.

1,178,746. Specification of Letters Patent. Patented Apr. 11, 1916.

Application filed October 3, 1914. Serial No. 864,855.

*To all whom it may concern:*

Be it known that I, ARTHUR R. MUTTON, a citizen of the United States of America, and a resident of Waterloo, Blackhawk county, Iowa, have invented certain new and useful Improvements in Registering Devices, of which the following is a specification.

My invention relates to improvements in registering devices, and particularly to those which are used in connection with a meter for measuring quantities of electric current, gas or other moving fluids or forces, and the object of my improvement is to provide an apparatus which will at any time desired, furnish the depositary of the meter with a permanent record of the condition thereof, and which will take the place of official inspections and reports thereof. This object I have accomplished by the mechanism which is hereinafter described and claimed, and which is illustrated in the accompanying drawings, in which:

Figure 1 is a front elevation of my improved registering device as operatively mounted upon a meter, parts of the same being shown broken away. Fig. 2 is a front elevation of said registering device with its covering lid removed. Fig. 3 is a front elevation of the casing of said device, with the mechanism removed therefrom. Fig. 4 is a vertical transverse section of the said device taken on the line $a$—$b$ of Fig. 2, and looking in the direction of the arrow. Fig. 5 is a vertical transverse section of the said device taken on the line $c$—$d$ of Fig. 2, and looking in the direction of the arrow. Fig. 6 is a plan view of one of the record blanks used with my said device, having thereon permanent records formed by means of the registering mechanism of the device. Fig. 7 is an end elevation of the casing, with the lower shaft and thumb-piece in section.

Similar numerals of reference denote corresponding parts throughout the several views.

My improved registering device may be employed, without departing from the principles of my invention, on any description of meter which has movable indices movable upon dial faces.

In Fig. 1 my registering device is shown mounted over the dial-plate 34 of a meter, said plate having a plurality of dials 26 arranged in a denary series. Instead of the usual hands or indices I have substituted indices 27 formed in the shape of beveled knife-blades, extending radially over the dials from operating shafts 35. These indices serve the usual purpose for direct readings. The casing 1 of my device is of rectangular form, and has a detachable covering-lid 33 hinged by means of curved pins 45 passed removably into orifices in the upper wall of the casing. The lower part of the lid is turned inwardly and has an interiorly-threaded hole in registration with a like interiorly-threaded hole in the lower wall of the casing, into which a screw 38 may be inserted to secure the lid to the casing. The casing has fixed ears 40 on its lower side provided with interiorly-threaded holes to receive screws 39 which serve to secure the ears and casing to the said meter. To prevent tampering with the mechanism within the casing, the said screws are transversely perforated, and a wire 41 passed through all of them with its meeting ends embedded in a seal 42. The casing 1 is divided into three compartments 2, 3 and 46 by means of vertical partitions 47 and 48, the latter having alined orifices adapted to seat the parallel shafts 4 and 5 which cross the upper and lower parts of the middle compartment 46. The left-hand end of the lower shaft 5 extends into the lower part of the compartment 2 and has a crank 6 supplied with a crank-pin 7. A coiled tension-spring 8 is connected between said crank-pin and the upper wall of the casing. The shaft 5 extends across the compartment 3 and passes out through an orificed seat in the casing. A thumb-piece 11 is mounted rotatably but non-slidably on the outer right-hand end of the shaft 5, but its rocking movement is limited by means of a fixed pin 12 on said shaft extended into an arc-shaped annularly arranged slot 13 in the thumb-piece. A crank 9 having a crank-pin 10, is fixedly mounted upon the shaft 5 within the compartment 3, as best shown in said Fig. 5. Upon the right-hand end of the upper shaft 4, within said compartment 3, is fixedly mounted a relatively long crank-arm 14, whose extremity or outer tip lies within the path of rotary movement of said crank-pin 10.

Referring now to said Figs. 2 and 4, the numerals 20 and 21 denote like rectangular plates placed in superposed registration with the plate 20 uppermost, and both plates having like circular openings 28 in registration with each other and with the underlying dials 26, but being of slightly greater diameter than said dials. The plate 29 has a pair of spaced hooked lugs 15 and 17 on its upper surface near its lower corners, and whose hooks open upwardly or toward the upper shaft 4. Within the larger middle compartment 46 these plates 20 and 21 are movably seated, and the lower plate 21 rests at top and bottom upon a pair of spaced horizontal plate-springs 29 and 30, whose ends are curved upwardly to support the plate at their ends yieldingly and to space the plate above the fields of action of the indices 27 thereunder. These springs are medially fixed to the bottom of the casing. A die-member 32 is fixed upon the middle of the upper spring 29 to extend through an opening in the plate 21 into a counterpart die-part 36 formed in intaglio in the plate 20, when the plates are forced down sufficiently. The die has such numerals or other characters formed therein as may represent or designate the particular meter upon which the particular recording device is mounted. The plates 20 and 21 are made independently movable, so that when not under compression, they may be held apart to keep the card-slot open to receive a card or thin sheet of paper. The card slip or paper being thin to be easily perforated, it is necessary to have said plates brought together to compress the slip between them by the action of the mechanism in pushing the plates down over the cutting edges of the indices to perforate a record. The slip must be tightly held or it might be torn or displaced while perforating a record thereon.

The numeral 24 denotes a solid longitudinally-arranged projection on the upper side of the casing, and which has a relatively long and narrow slit or passage 25 curved downwardly to prevent the intrusion of an implement or tampering. The passage 25 communicates with the compartment 46 by way of a space between a fixed depending shield 23, and a flange-plate 22 fixed on the upper edge of the movable plate 21. By these means a record card 41 may be introduced into the interspace of the plates 20 and 21 between the openings 28 thereof and overlying the oblong slot 31 in the back wall of the casing.

The numerals 16 and 18 denote like fixed arms on the shaft 4, located within the compartment 46 over the plate 20, and having their extremities movably engaged under the hooks of the lugs 15 and 17, respectively, of said plate.

The numeral 19 denotes a light spring mounted on the shaft 4 and which bears upon the left-hand arm 18 and tends to lift said arms to keep the upper plate 20 spaced from the under plate 21, to permit of the card 41 being slipped, without impediment, into the interspace of the plates.

The numeral 41 denotes a record card, having dials 42 printed thereon, in proper locations to overlie like dials 26 on the dial-plate 34, and within the encircling openings 28 in the plates 20 and 21, when the card is inserted between said plates.

Operation: When a record card 41 has been properly inserted between the plates 20 and 21, to place the dials 42 thereof concentric with said openings 28, the device may be used to take a permanent record on the card, displaying the respective positions of the indices 27 at the exact moment of actuation. This is effected by rotating the thumb-piece 11 once. The rotation of the shaft 5 simultaneously places the spring 8 under complete tension, and brings the crank pin 10 immediately over the extremity of the crank-arm 14, as indicated in Fig. 2. As the crank-pin 7 passes its dead-center, the spring 8 suddenly and powerfully reacts, causing the crank-pin 10 to give a quick fillip to the arm 14 in passing it, and the upper shaft 4 is thus suddenly rocked together with its pair of arms 16 and 18 to press down the plate 20, to also compress the card 41 between it and the plate 21, while bearing down the plate-springs 29 and 30 sufficiently, so that the knife-edges of the indices 27 are forced through said card to leave permanent slotted records 43 thereon showing their relative positions at that instant. The spring 8, having reacted, the other springs 29 and 30 are released to react in turn and move the plates 20 and 21 to their first positions, removing the card instantly from said indices. It will be observed, that while the device is acting to make the slotted records from said indices, that the plates 20 and 21 have moved down upon the die 32 so that the latter, in conjunction with the counterpart die-face 36, embosses the numeral 44 of this individual meter upon the card, so that the complete record upon the card 41 remains as displayed in said Fig. 6, which is a record practically impossible to be changed. By reason of the limited pivotal mounting of the thumb-piece 11 and the arrangement of the arm 14 and coacting crank-pin 10 in the compartment 3, the device cannot be tampered with, nor reversely actuated by rocking the thumb-piece and shaft 5 backwardly.

The use of this apparatus will save the expenses of periodical inspection by special officials, and permits the user to take a permanent record at any time.

Referring to Figs. 1 and 7, the casing 1 and closure 33 have integral registering half-sleeves 49 and 50 which are seated about the body of said thumb-piece 11 to cover the groove 13 therein and extend into the notches in the finger-lugs of the thumb-piece. This means prevents any one tampering with the device by inserting an instrument into the groove 13 to thereby hold the slip-holding plates down with a slip engaged upon said indices to stop the meter action, while permitting the flow of current therethrough unregistered.

Having described my invention, what I claim as new, and desire to secure by Letters Patent, is:

1. A device of the character described, comprising the combination with a dial provided with a movable index formed with a knife-edge, of a pair of spaced holding-bodies each independently movable to and from each other above said dial and having registering like openings over said dial and index, yieldable resilient means for supporting said plates spaced from said dial and index, said plates being adapted to receive a record-slip in their interspace between their registering openings, and means for compressing said plates upon said springs to cause the latter to yield and permit the knife-edge of said index to penetrate the record-slip.

2. A device of the character described, comprising the combination with a dial provided with a movable index formed with a knife-edge, of spaced like independently-movable separable holding plates having like registering openings overlying said dial and index, yieldable resilient supporting-means for the plate nearest said dial, and means for imparting a sudden fillip to the uppermost plate to force both it and the undermost plate toward the dial against the yielding tension of said resilient means.

3. A device of the character described, comprising the combination with a dial provided with a movable index formed with a knife-edge, of spaced like holding-plates having like registering openings overlying said dial and index, yieldable resilient supporting means for the plate nearest said dial, and means for imparting a sudden fillip to the uppermost plate to force both it and the undermost plate toward the dial against the yielding tension of said resilient means, consisting of a fixed support, a rotary shaft mounted therein and having a crank, yieldable resilient means connected between said crank and said fixed support, said shaft having another crank thereon, and movable means between said crank and the uppermost of said plates adapted to suddenly move the plate when the shaft is rotated to first stretch and then release said resilient means connected thereto.

4. A device of the character described, comprising the combination with a dial provided with a movable index formed with a knife-edge, of spaced holding-plates having like registering openings overlying said dial and index, yieldable resilient supporting-means for the plate nearest said dial, other yieldable resilient supporting-means for the uppermost plate adapted to space it from the undermost plate, and means for imparting a sudden fillip to the uppermost plate to force it and the undermost plate against the tension of both resilient means toward the said dial and index.

5. A device of the character described, comprising the combination with a dial provided with a movable index formed with a knife-edge, of spaced independently movable holding-plates having like registering openings overlying said dial and index, yieldable resilient supporting-means for the plate nearest said dial, a fixed die-member located adjacent to said dial under the lowermost plate, said lowermost plate having an opening overlying said die-member, and the uppermost plate having a counterpart die-member on its face opposite the last-mentioned opening in the lowermost plate and adapted to coactuate with the first-mentioned die-member, when said plates are moved against the tension of said resilient means toward said dial and its index.

6. A device of the character described comprising the combination with a dial provided with a movable index formed with a knife-edge, of a pair of spaced like holding-plates having like openings in registration with each other and overlying said dial and its index, spaced yieldable resilient supporting means for the opposite longitudinal edge-parts of the undermost plate adapted to yieldingly force it away from said dial and index, means for yieldingly and resiliently keeping said plates spaced apart from each other, and means for imparting a sudden downward movement of both plates toward said dial and index against the tension of all said resilient means, comprising spaced shafts mounted over the opposite longitudinal parts of the uppermost plate, the uppermost plate having hook-shaped lugs on its outer face, one of said shafts having like arms whose ends are movably engaged under said lugs, and having another arm near one end, the other shaft having a crank provided with a pin located in the path of movement of the last-mentioned arm, a fixed support, said last-mentioned shaft having another crank provided with a pin, and a yieldable coiled tension-spring connected between said last-mentioned crank-pin and said fixed support.

7. A device of the character described, comprising the combination with a dial provided with a movable index formed with a knife-edge, of a pair of spaced like holding-plates having like openings in registration with each other and overlying said dial and its index, spaced yieldable resilient supporting-means for the opposite longitudinal edge-parts of the undermost plate adapted to yieldingly and resiliently keeping said plates spaced apart from each other, and means for imparting a sudden downward movement of both plates toward said dial and index against the tension of all said resilient means, and a casing inclosing said mechanism, said casing having a curved passage leading to the interspace of said plates adapted to permit the introduction of a record-slip thereinto.

8. A device of the character described, comprising the combination with a dial provided with a movable index formed with a knife-edge, of a pair of spaced like holding-plates having like openings in registration with each other and overlying said dial and its index, spaced yieldable resilient supporting means for the opposite longitudinal edge-parts of the undermost plate adapted to yieldingly force it away from said dial and index, means for yieldingly and resiliently keeping said plates spaced apart from each other, and means for imparting a sudden downward movement of both plates toward said dial and index against the tension of all said resilient means, a sectional casing for said mechanism, and means for sealing the sections of said casing together.

9. A device of the character described, comprising a movable index, slip-holding means movably supported above said index, an open-topped casing about said parts, a closure removably secured over the open top of the casing, a shaft rotatably mounted in said casing and having one end projecting therefrom, said casing and closure having a bearing for said shaft at their junction on one side, elements operatively connected between said shaft and said slip-holding means adapted to be actuated to move said means to and from said index, a sleeve mounted for limited rocking movements on the outer end of said shaft, said sleeve having oppositely-projecting finger-pieces notched on their sides adjacent to said casing, and said casing and closure having registering half-sleeves seated about said other sleeve and extending into the notches of said finger-pieces.

Signed at Waterloo, Iowa, this 18th day of Sept. 1914.

ARTHUR R. MUTTON.

Witnesses
 GEO. C. KENNEDY,
 PEARL STANTON.

Copies of this patent may be obtained for five cents each, by addressing the "Commissioner of Patents, Washington, D. C."